(12) United States Patent
Ortowski et al.

(10) Patent No.: US 11,148,933 B2
(45) Date of Patent: Oct. 19, 2021

(54) PORTABLE, DUAL-CHAMBERED, SILO TANK FUELING SYSTEM

(71) Applicant: ORTEQ ENERGY TECHNOLOGIES, LLC, Gainesville, TX (US)

(72) Inventors: Cody Joe Ortowski, Fort Worth, TX (US); Christopher Cole Ortowski, Fort Worth, TX (US); Jarrett Thomas Wilson, Fort Worth, TX (US); David Lee Arnoldy, Sanger, TX (US); John Edward Saville, Denton, TX (US)

(73) Assignee: ORTEQ ENERGY TECHNOLOGIES, LLC, Gainesville, TX (US)

( * ) Notice: Subject to any disclaimer, the term of this patent is extended or adjusted under 35 U.S.C. 154(b) by 0 days.

(21) Appl. No.: 17/263,083

(22) PCT Filed: Dec. 6, 2019

(86) PCT No.: PCT/US2019/065044
§ 371 (c)(1),
(2) Date: Jan. 25, 2021

(87) PCT Pub. No.: WO2020/118237
PCT Pub. Date: Jun. 11, 2020

(65) Prior Publication Data
US 2021/0261402 A1     Aug. 26, 2021

Related U.S. Application Data (60) Provisional application No. 62/776,447, filed on Dec. 6, 2018.

(51) Int. Cl.
*B67D 7/78* (2010.01)
*B67D 7/46* (2010.01)
(Continued)

(52) U.S. Cl.
CPC ............ *B67D 7/78* (2013.01); *B65D 88/54* (2013.01); *B67D 7/46* (2013.01); *B67D 7/56* (2013.01); *B67D 7/62* (2013.01); *B67D 7/845* (2013.01)

(58) Field of Classification Search
CPC ... B67D 7/78; B67D 7/62; B67D 7/56; B67D 7/46; B67D 7/845; B65D 88/54
See application file for complete search history.

(56) References Cited

U.S. PATENT DOCUMENTS

| 1,263,810 A | 4/1918 | Sauermann |
| 1,734,604 A | 11/1929 | Smith |

(Continued)

FOREIGN PATENT DOCUMENTS

| CA | 2693567 | 10/2010 |
| CN | 2138219 Y | 7/1993 |

(Continued)

OTHER PUBLICATIONS

Iwanejko, Zdzislaw—WO2016039652A1—Pub. Date Mar. 17, 2016—A pouring device for filling up a liquid in a reservoir, particularly in the windscreen washer reservoir of an automotive vehicle and the use of this device—Written Opinion of ISA.

(Continued)

*Primary Examiner* — Jason K Niesz
(74) *Attorney, Agent, or Firm* — Guy V. Manning (57) ABSTRACT

A fleet refueling silo tank system gravity feeds fuel through hoses to fleet units without requiring pressurizing pumps. Specialized valves at the fleet unit fuel tanks prevent vapor escape and admit fuel at low, gravity fed pressures. The cylindrical silo tank includes an upper, gravity feed dispensing chamber and a lower reservoir chamber. A fuel pump doubles as means for moving fuel from the reservoir chamber to the dispensing chamber and for refilling the reservoir (Continued)

from fuel delivery trucks. Onboard telemetry transmits fuel consumption and flow rates wirelessly to a control center where operators monitor safety parameters in real time. Stored data may be analyzed to calculate fleet unit maintenance and service intervals. A tractor trailer hauls the silo tank horizontally on roads and highways and includes a gantry and hydraulic lifts to erect the silo tank into vertical operating position supported by a built-in platform.

17 Claims, 13 Drawing Sheets

(51) Int. Cl.
  *B65D 88/54* (2006.01)
  *B67D 7/62* (2010.01)
  *B67D 7/84* (2010.01)
  *B67D 7/56* (2010.01)

(56) References Cited

U.S. PATENT DOCUMENTS

| | | | |
|---|---|---|---|
| 1,923,574 A | 8/1933 | Hansen | |
| 1,930,954 A | 10/1933 | Hansen | |
| 1,998,221 A | 4/1935 | Conklin | |
| 2,302,766 A | 11/1942 | Grise | |
| 2,504,450 A | 4/1950 | Rhodes | |
| 2,738,801 A | 3/1956 | Reaves | |
| 3,160,171 A | 12/1964 | Klein | |
| 3,352,461 A | 11/1967 | Dascanio | |
| 3,709,251 A | 1/1973 | Manor | |
| 3,774,654 A | 11/1973 | Hjermstad | |
| 3,809,115 A | 5/1974 | Klein | |
| 4,114,641 A | 9/1978 | Robinson et al. | |
| 4,184,774 A | 1/1980 | Krauss | |
| 4,462,417 A | 7/1984 | Trinkwalder | |
| 5,072,751 A | 12/1991 | Lin | |
| 5,141,019 A | 8/1992 | LeBlanc et al. | |
| 5,472,012 A | 12/1995 | Wood et al. | |
| 5,487,404 A | 1/1996 | Kerger | |
| 5,634,505 A | 6/1997 | Wong | |
| 6,408,869 B1 | 6/2002 | Bartos et al. | |
| 6,450,196 B1 | 9/2002 | Bartos | |
| 6,572,340 B2 | 6/2003 | Collins | |
| 6,588,445 B2 | 7/2003 | Knowles et al. | |
| 6,616,427 B2 | 9/2003 | Carnes et al. | |
| 6,619,341 B2 | 9/2003 | Cushing | |
| 7,556,056 B2 | 7/2009 | Hutchinson | |
| 7,713,652 B2 | 5/2010 | Hutchinson | |
| 8,550,128 B2 | 10/2013 | Mitrovich | |
| 8,631,818 B2 | 1/2014 | Mitrovich | |
| 9,346,662 B2 | 5/2016 | Van Vliet et al. | |
| 9,371,830 B2 | 6/2016 | Moffit, Jr. | |
| 9,371,831 B2 | 6/2016 | Moffit, Jr. | |
| 9,751,749 B1 | 9/2017 | Moffit, Jr. | |
| 9,802,809 B1 | 10/2017 | Schultz et al. | |
| 9,856,131 B1 | 1/2018 | Moffit, Jr. | |
| 10,017,374 B1 | 7/2018 | Moffit, Jr. | |
| 10,106,396 B1 | 10/2018 | Moffit, Jr. | |
| 2011/0220243 A1 | 9/2011 | Szabo | |
| 2013/0142601 A1 | 6/2013 | McIver et al. | |
| 2014/0076421 A1 | 3/2014 | Kuehn et al. | |
| 2016/0244314 A1* | 8/2016 | Van Vliet | B67D 7/04 |
| 2017/0101305 A1* | 4/2017 | McKay | B67D 7/04 |
| 2017/0275149 A1* | 9/2017 | Schmidt | B67D 7/0401 |

FOREIGN PATENT DOCUMENTS

| | | |
|---|---|---|
| CN | 2851740 Y | 12/2006 |
| CN | 202927222 U | 5/2013 |
| FR | 2290392 A1 | 6/1976 |
| GB | 140961 A | 4/1920 |
| GB | 245520 A | 1/1926 |
| GB | 691078 A | 5/1953 |
| GB | 1567472 A | 5/1980 |
| GB | 2133508 A | 7/1984 |
| JP | 2837213 B2 | 12/1998 |
| JP | 2003021259 A | 1/2003 |
| JP | 2012042043 A | 3/2012 |

OTHER PUBLICATIONS

Fluid Valves Limited brochure for product No. FV46.75FG—dimensions and specifications.
Universal Valve Co brochure for part No. 47-20, Fig. at right.

\* cited by examiner

PORTABLE, DUAL-CHAMBERED, SILO TANK FUELING SYSTEM

BACKGROUND OF THE INVENTION

1. Field of the Invention

This invention relates generally to oil and gas production, and particularly to hydraulic fracturing (fracking) systems and practices. More particularly, this invention relates to a silo tank system for refueling fracking fleet vehicles, and the fuel distribution system associated therewith.

2. Description of Related Art

Hydraulic fracturing, or fracking, comprises an oil and gas production practice whereby fracking fluid, composed mostly of water and sand, is injected into subterranean strata to fracture said strata and release desirable hydrocarbons. Fracking units (see FIG. 2) comprise truck/trailer combinations bearing high pressure pumps and piping for directing fracking fluid down pre-drilled bore holes into suspected deposits of hydrocarbon minerals. Though trailer mounted for portability, fracking units operate continuously while in situ and must be refueled constantly. A system that provides fuel to such units on a reliable, continuous basis, while operating safely in a hazardous environment, is highly desirable.

Figure 14:
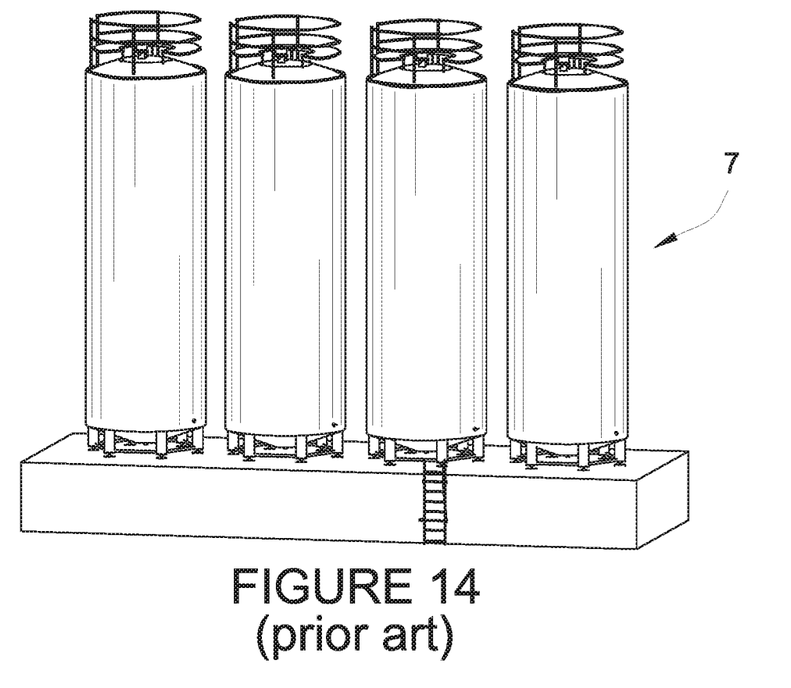
FIGS. 14 and 15 show prior art fuel storage units.
Figure 15:
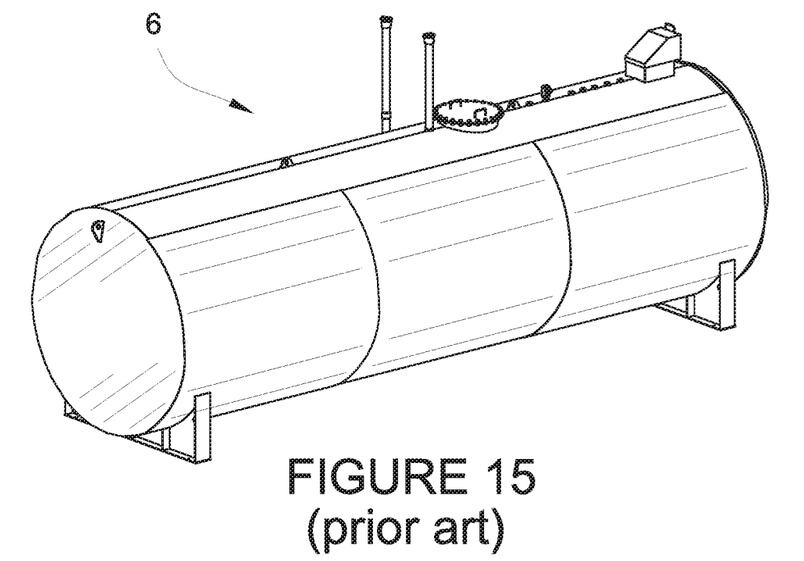
Figure 16:
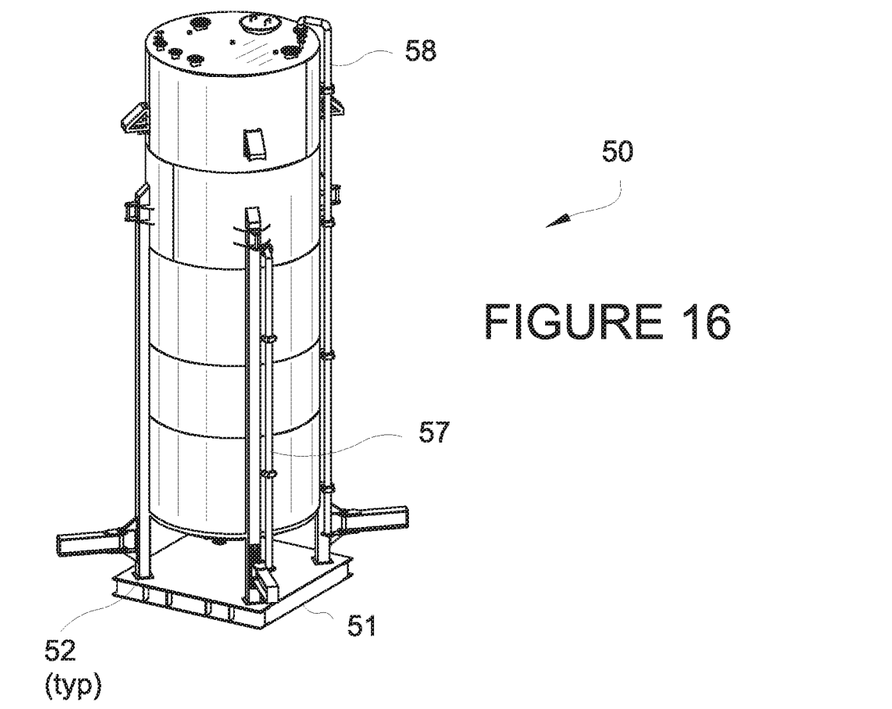
FIGS. 16 and 17 show the dual-chambered fuel silo tank of the present invention.

Traditional refueling systems comprise fuel storage tanks either truck- or skid-mounted or fixed on a non-portable foundation arrangement (see FIGS. 14, 15). The storage tanks are coupled by hoses to fracking units and other equipment arrayed around a fracking site and needing periodic refueling. To induce fuel to flow through the hoses to tanks on various equipment, traditional systems employ pumps which pressurize the fuel, typically to fifty (50) psi or greater. Such fuel distribution hoses are understandably vulnerable to accidents within an industrial environment such as fracking sites. The hoses can leak or rupture due simply to their internal pressure, causing spills and risking catastrophic accidents. A refueling system which relies only upon gravity feed can mitigate the risks of pressurized hoses, as well as obviate the need for pressuring pumps.

Fuel tanks mounted on fracking units traditionally include capped mouths not unlike those for automobile fuel tanks, and they traditionally are similarly refilled using open-air nozzles similar to those found at commercial gas stations for refueling automobiles. Though vapor-capturing apparatus and methods may be employed, vapors still escape, especially from pressurized hoses, presenting risks from random sparks causing vapors to ignite. A refueling system that includes vapor-proof apparatus and methods would be superior to traditional systems.

A valve which threads onto the mouth of equipment fuel tanks would serve this purpose, but it must operate under varying conditions, including varying fuel pressure, flow rates and sometimes uneven terrain. The mouth of some fracking unit tanks is directly atop the tank, while others are angled outward as much as forty-five (45) degrees from vertical. A need exists for a fuel valve that can integrate with myriad equipment fuel tanks and operates smoothly and reliably under such varying conditions, all the while employing gravity fed instead of pressured hoses.

For a properly functioning, gravity-feed refueling system to impel fuel through hoses to multiple fracking site equipment units, the refueling system needs to provide a reliable head pressure of approximately seven (7) psi at the fuel supply outlet, well below the typical pump-pressurized levels currently in use. Traditional refueling systems without pressurizing pumps cannot do this reliably. Even for silo-style fuel reservoirs, the hydraulic head pressure necessarily drops as the level of fuel in the silo drops, approaching zero psi as the fuel level nears the bottom of the tank. A need exists for a gravity-feed fuel storage tank system that reliably maintains a minimum outlet pressure.

Non-truck- or skid-mounted traditional fracking fuel storage systems, whether vertical or horizontal, typically are not portable, but instead fixed in one location. Relocating a fracking unit served by them usually entails new construction of the fuel storage system at a new location. Fracking units sometimes move frequently and to unexpected locations, and delays can be costly. A need exists for a portable fuel tank storage and dispensing system which can be transported and set up in a minimum amount of time.

SUMMARY OF THE INVENTION

A fleet refueling silo tank system gravity feeds fuel through hoses to fleet units without requiring pressurizing pumps. Specialized valves at the fleet unit fuel tanks prevent vapor escape and admit fuel at low, gravity fed pressures. The cylindrical silo tank includes an upper, gravity feed dispensing chamber and a lower reservoir chamber. A fuel pump doubles as means for moving fuel from the reservoir chamber to the dispensing chamber and for refilling the reservoir from fuel delivery trucks. Onboard telemetry transmits fuel consumption and flow rates wirelessly to a control center where operators monitor safety parameters in real time. Stored data may be analyzed to calculate fleet unit maintenance and service intervals. A tractor trailer hauls the silo tank horizontally on roads and highways and includes a gantry and hydraulic lifts to erect the silo tank into vertical operating position supported by a built-in platform.

BRIEF DESCRIPTION OF THE DRAWINGS

The novel features believed characteristic of the present invention may be set forth in appended claims. The invention itself, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
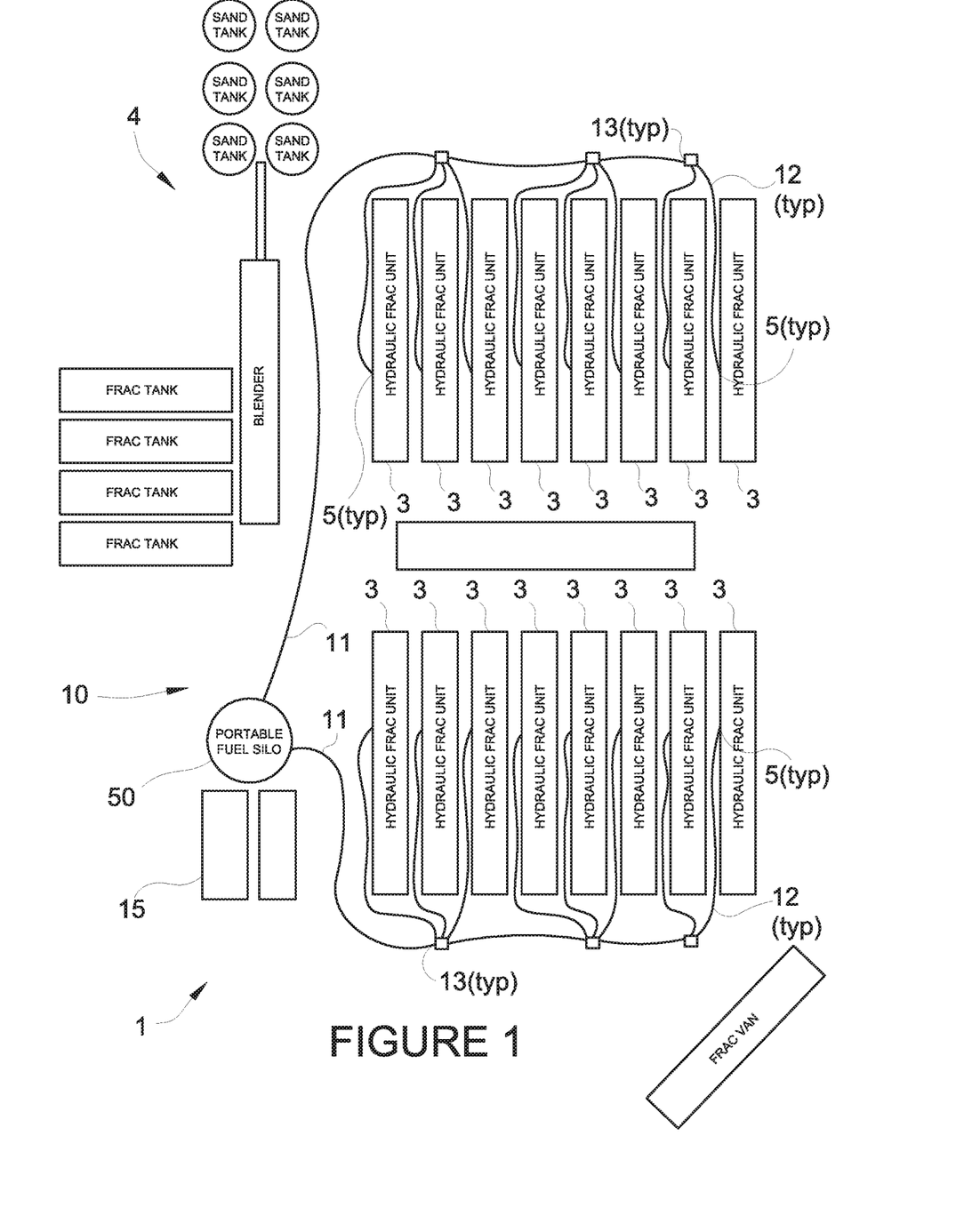
FIG. 1 shows in plan view a typical hydraulic fracking site and installation.
Figure 2:
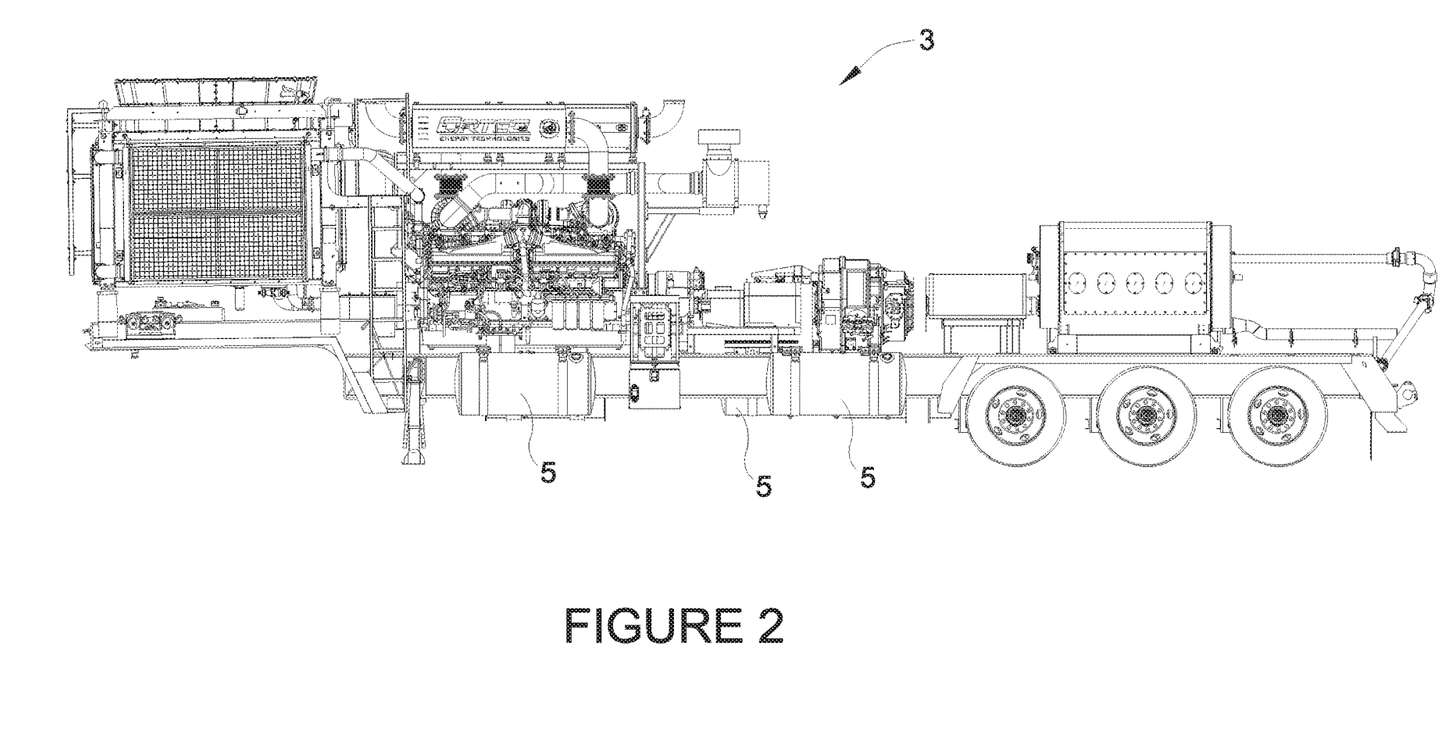
FIG. 2 shows a typical hydraulic fracking unit.

Referring now to the figures, and particularly to FIGS. 1-2, a typical hydraulic fracturing (fracking) site 1 layout includes a plurality of fracking units 3 arrayed together to inject fracking fluid into subterranean strata. Fracking units 3 are juxtaposed largely to take advantage of peripheral systems such as sand/water blending system 4 for creating fracking fluid, and also for advantageous proximity to fueling system 10. Each fracking unit comprises a tractor trailer unit 3 (FIG. 2) bearing the required fracking fluid injection equipment, as well as a control cab and trailer-mounted fuel tank 5.

Stationed near units 3, fuel storage and distribution system 10 includes at least one silo tank 50 coupled to fracking units 3 through fuel distribution apparatus 11, 12, 13. Though not shown in the figures, silo tank 50 also could be coupled to other equipment, such as sand/water blending system 4, or other equipment, including vehicles, which might need refueling. Control van 15 houses monitoring and telemetry equipment to monitor fueling system 10 operations as well as to capture and log fuel flow rates, pressures and the like in real time, enabling a operator (not shown) to react to unexpected circumstances.

Fuel Distribution System

Turning now also to FIGS. 3-7, refueling system 10 of the present invention comprises silo tank 50 shown with trunk lines 11 which extend to distribute fuel to fracking units 3. Though system 10 is depicted in the figures and discussed below in the context of a single silo tank 50, one having ordinary skill in the art will recognize that multiple silo tanks 50 could be ganged together at a given site 1 to increase capacity, depending upon the number and fuel requirements of units 3.

Figure 3:
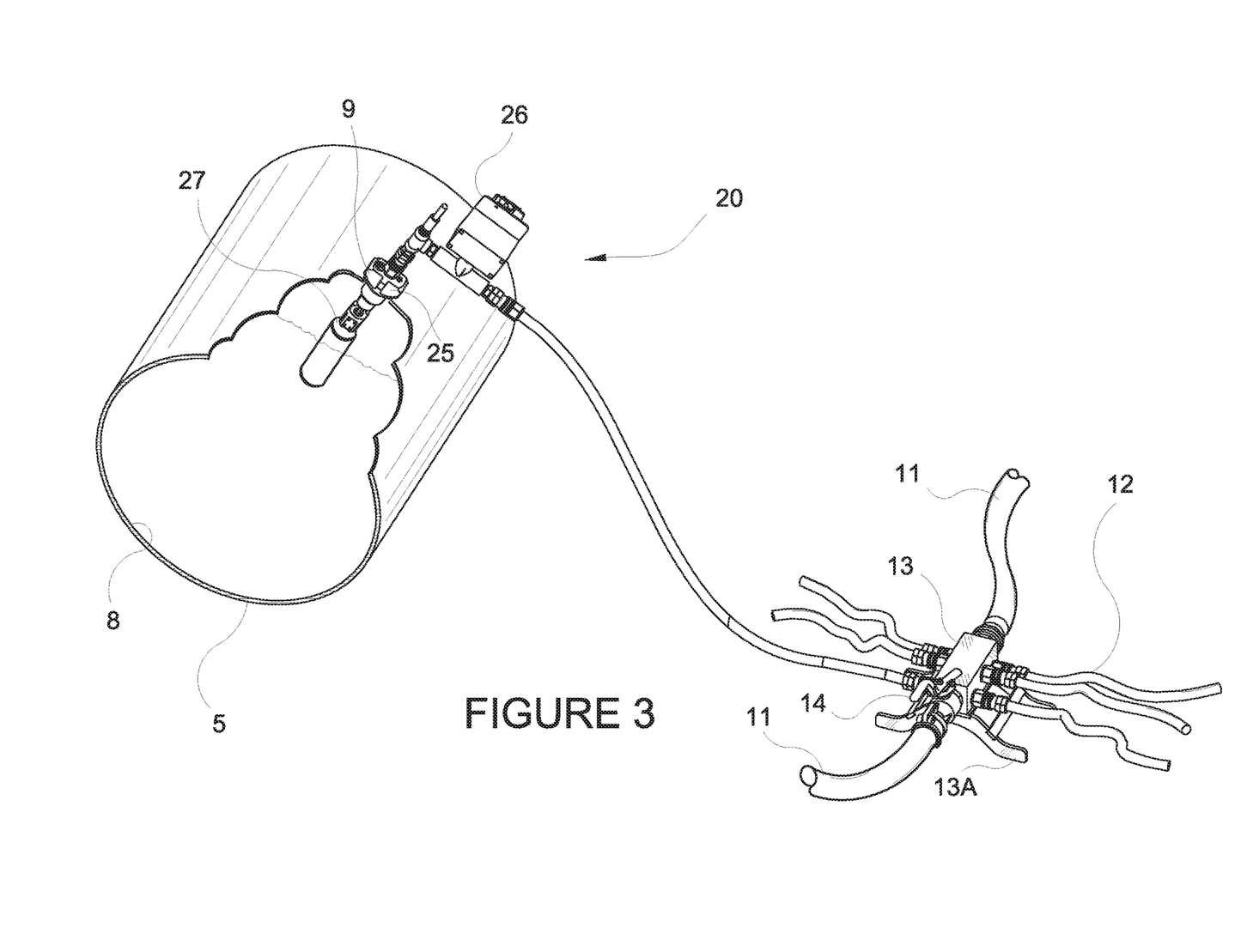
FIGS. 3 and 4 detail the fuel distribution system shown in FIG. 1.
Figure 4:
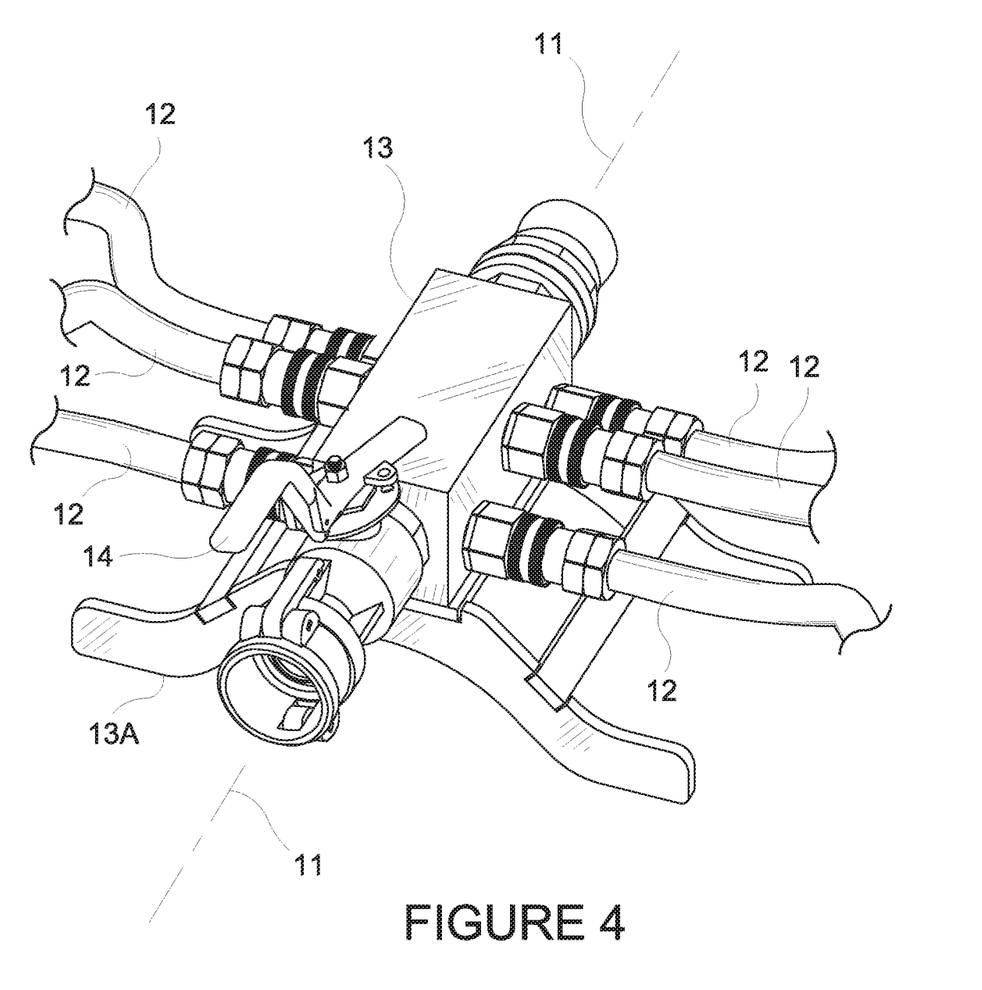

Disposed among fracking units 3, manifolds 13 branch trunk lines 11 into individual tap lines 12 which extend to each of the fracking unit fuel tanks 5 so that all fracking units 3 may be fed simultaneously. Manifolds 13 preferably include throttle controls 14 which permit adjustment of flow rates through trunk lines 11, enabling an operator (not shown) to fine-tune fuel pressure to each unit tank 5. Manifolds 13 may be mounted conveniently, such as on stand 13A.

As best seen in FIG. 3, each fuel tank interface 20 terminates each tap line 12 at one fracking unit tank 5. Interface 20 includes a nipple coupled to threaded cap 25 adapted to mate with and seal tank 5's mouth 9 to prevent vapor escaping. Meter 26 measures fuel flow into tank 5 and includes wireless telemetry capable of connecting with receivers in control van 15 for real time monitoring of fuel flow and consumption by fracking unit 3. A pressure relief valve (not shown) may limit pressure buildup within tank 5.

Figure 12:
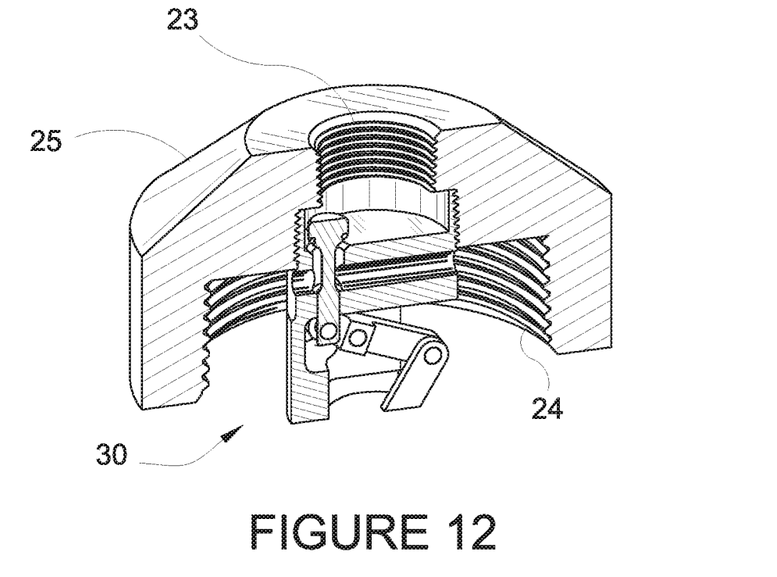
Figure 13:
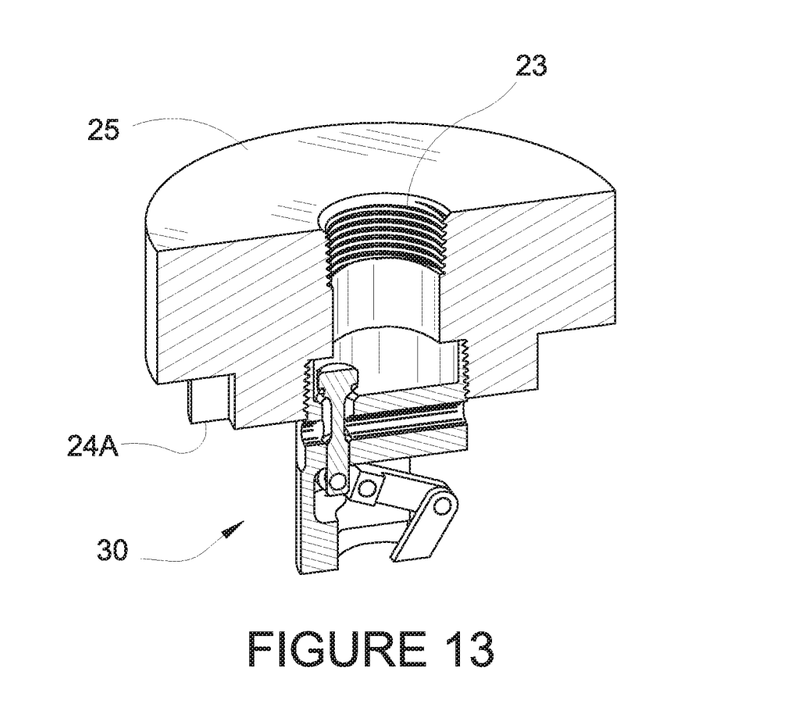

As mentioned above, the mouths 9 of tank 5 may vary by threaded 24 or bayonet-style 24A (FIGS. 12, 13) closure, size and orientation, but typically are disposed on the upper side of tank 5. The present invention includes a plurality of caps 25 (see FIGS. 12 and 13) adapted to interface with tank 5 mouths 9 for various types of fracking unit tanks 5. One having ordinary skill in the art will recognize that there may be other types of caps 25 for other tanks 5 not depicted, and that any interface cap 25 for each such application is considered to be within the spirit and scope of the present invention.

Fuel Tank Valve

Figure 5:
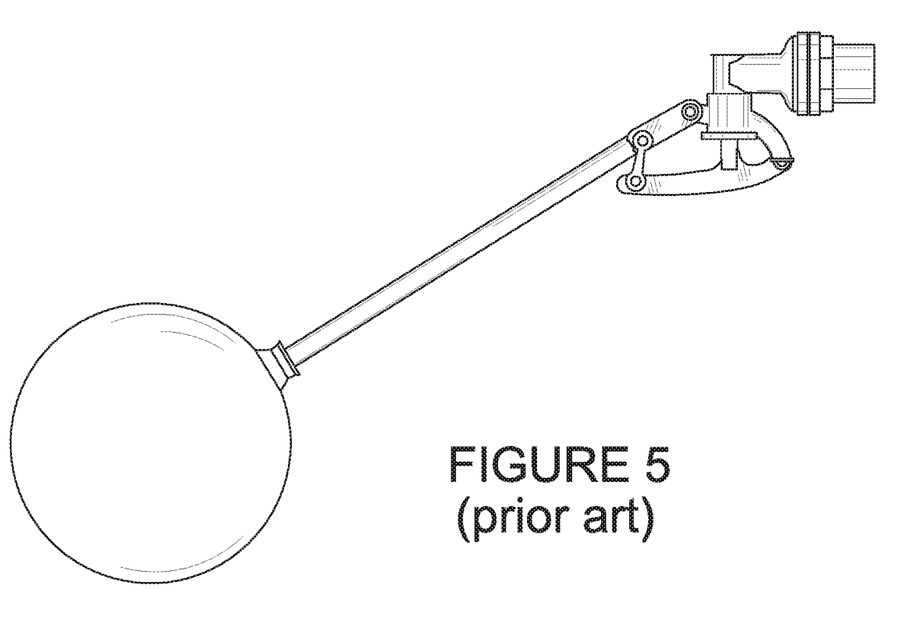
FIGS. 5 and 6 show prior art fracking unit fuel tank control valves.
Figure 6:
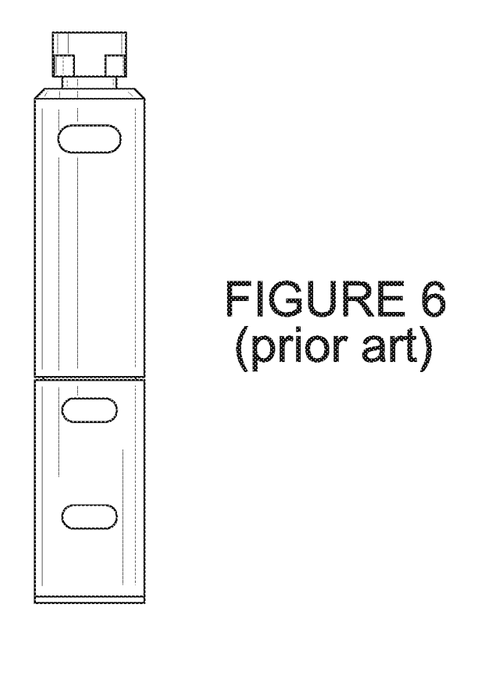

FIGS. 5, 6 show two types of prior art valves available for similar applications, neither of which is satisfactory. The valve shown in FIG. 5 is an industrially available float valve that senses liquid levels, but it requires that mouth 9 of tank 5 be oriented so that the valve remains upright at all times, and the large float could not be deployed through the mouth of tank 5 without modification. The valve shown in FIG. 6 is marketed for fracking unit tank 5 applications but is not suitable for continuous fill nor non-vertical orientations. It also includes internal springs which resist fuel pressure from taps 12 and may prove unsatisfactory for the low, gravity-fed pressure levels anticipated for the present invention.

Figure 7:
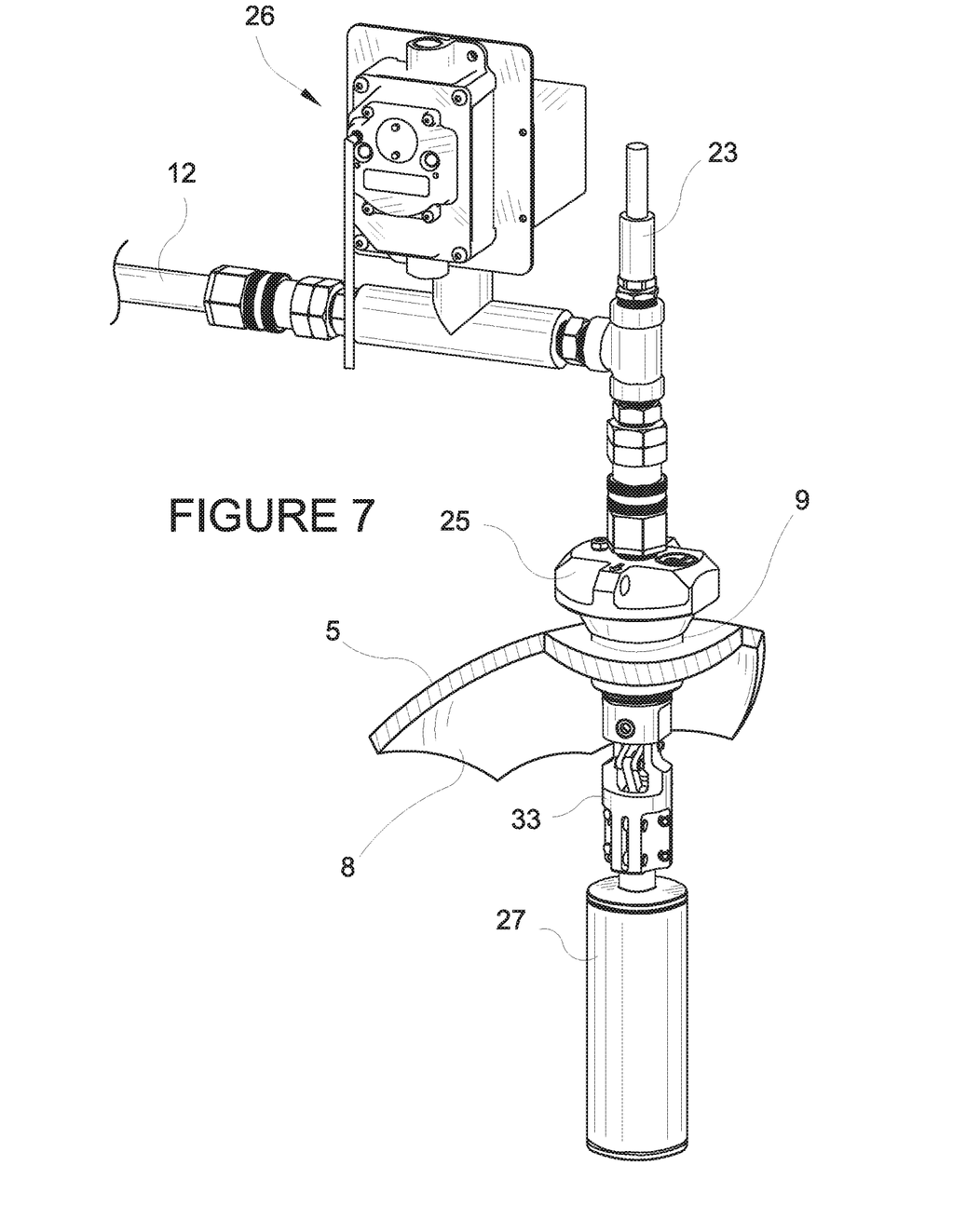
FIGS. 7-13 detail the fracking unit fuel tank control valve of the present invention.
Figure 8:
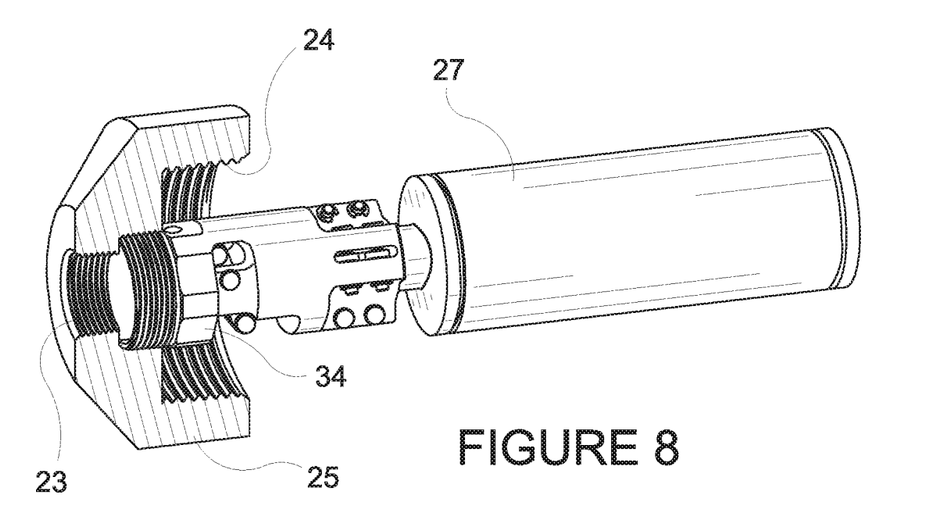
Figure 9:
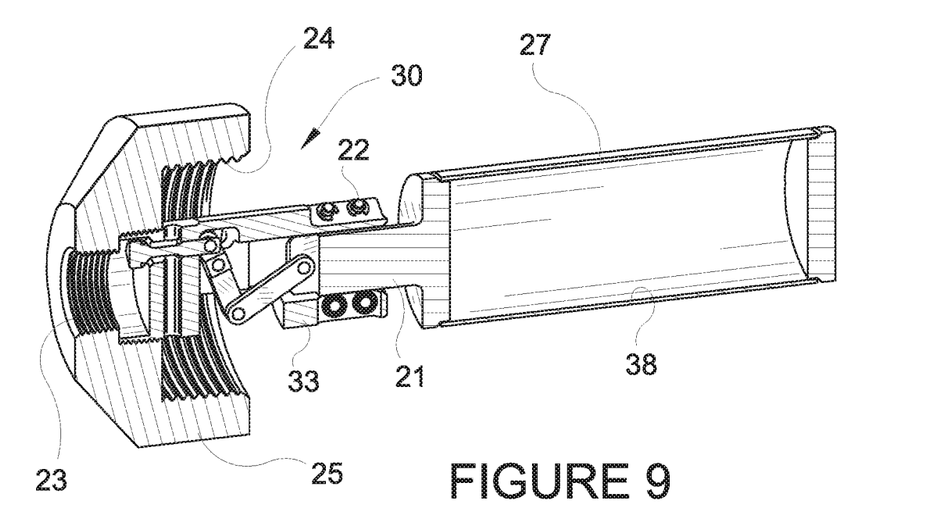

Fuel valve 30 of the present invention depends from cap 25 through mouth 9 and into the interior of fuel tank 5 so that float 27 engages fuel (not shown) within tank 5. Float 27 couples to cap 25 through neck 21, linkage 34, valve body 33 and orifice plunger 35 to regulate the flow of fuel (not shown) through fill line 36 and into tank 5. Float 27 comprises a hollow cylinder having a diameter capable of passing through the mouth of tank 5, making it easy to install. Preferably, it is fabricated in three pieces from stainless steel bar stock, and welded together to create an air tight interior for buoyancy. One having ordinary skill in the art will recognize that float 27 could be fabricated from other non-reactive materials, such as aluminum or diesel-compatible thermoplastics without departing from the spirit and scope of the present invention.

Figure 10:
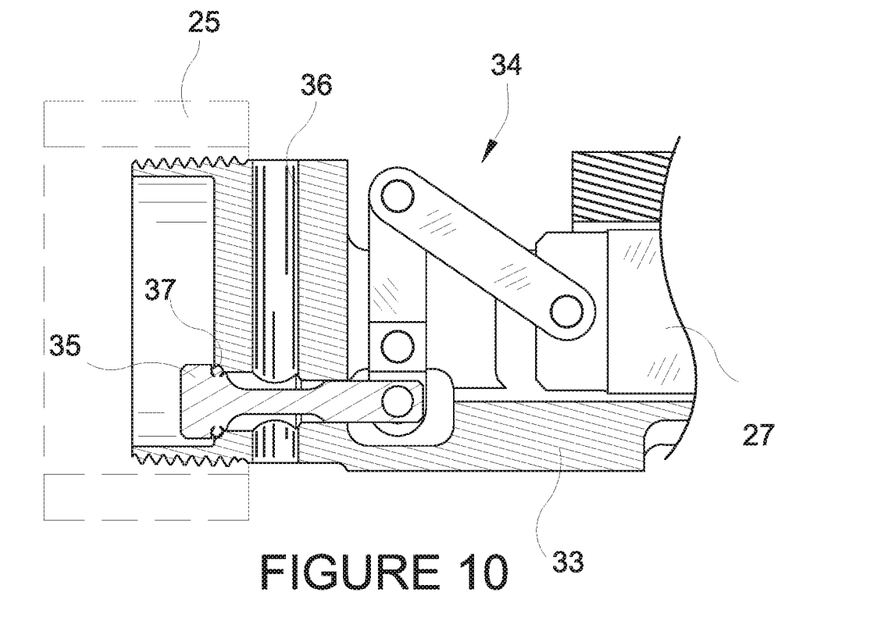
Figure 11:
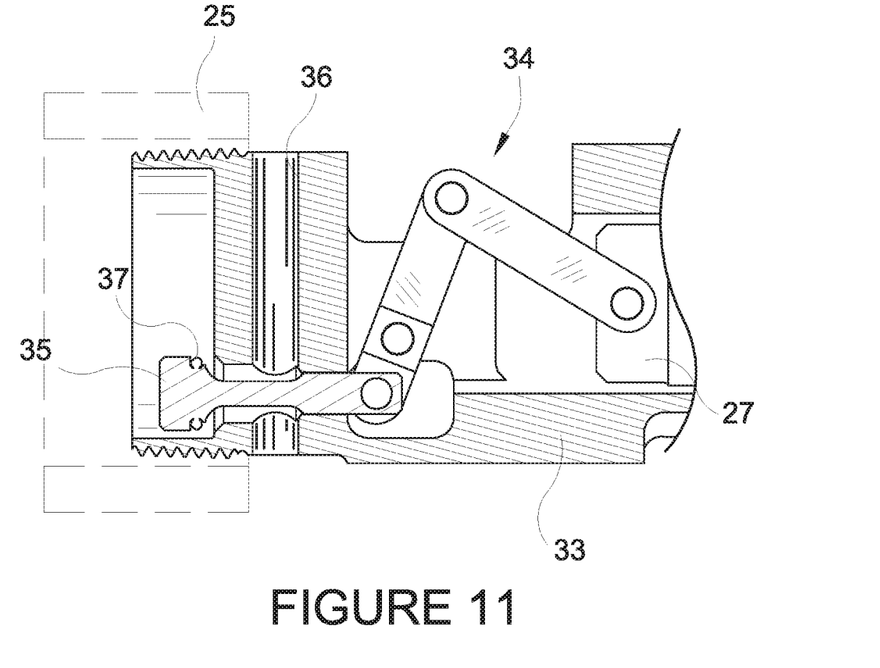

Float 27 couples to valve 30 by neck 21 slidably engaged by roller bearings 22 to maintain smooth, longitudinal movement to flex linkage 34 to open and close plunger 35. With linkage 34 configured as shown in FIGS. 10, 11, connecting between float 27 and plunger 35, valve 30 requires no seat springs nor external pneumatic or mechanical mechanisms to regulate the level of fuel within tank 5. Pressure of fuel against plunger 35 need not be of an amount sufficient to depress a seat spring, as none is present. Valve 30 opens and closes solely in response to the level of fuel in tank 5 as determined by float 27.

Silo Tank

Turning now also to FIGS. 14-17, typical fuel storage tanks 6, 7 comprise a plurality of vertical, silo-type tanks (FIG. 14) and a horizontal, skid-mounted tank 6. As discussed above, horizontal tanks 6 cannot provide the minimum outlet pressure because their head pressures are low, thus requiring pressurizing pumps (not shown) to induce fuel to flow toward fracking units 3 and their tanks 5. Also as discussed above, silo-style tanks 7 similarly fail when their fuel levels drop, also requiring pressurizing pumps to maintain minimum outlet pressure.

Figure 17:
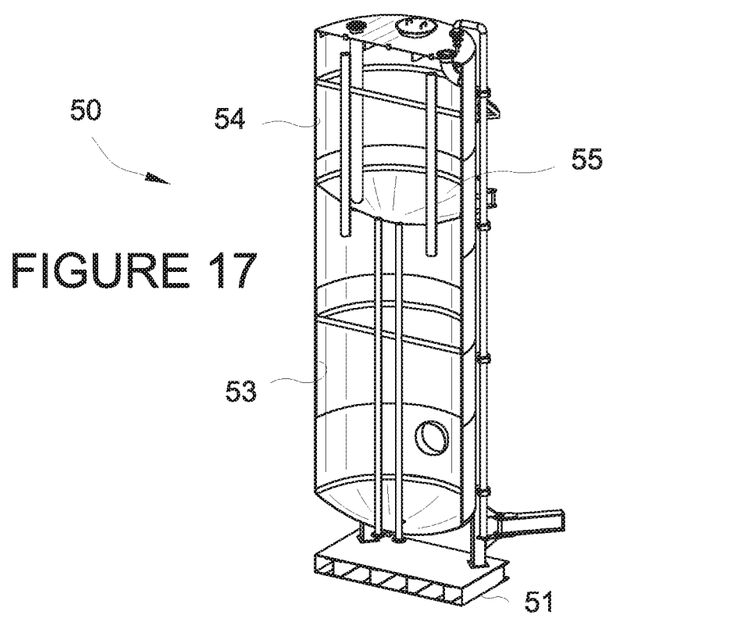
Figure 18A:
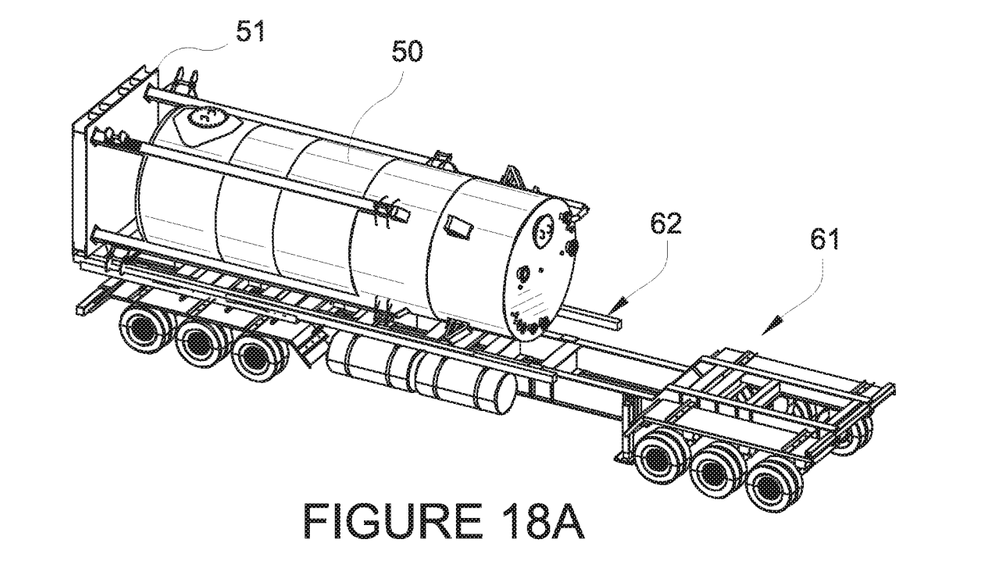
FIGS. 18A-18D show the portability feature of the dual-chambered fuel silo tank of the present invention.
Figure 18B:
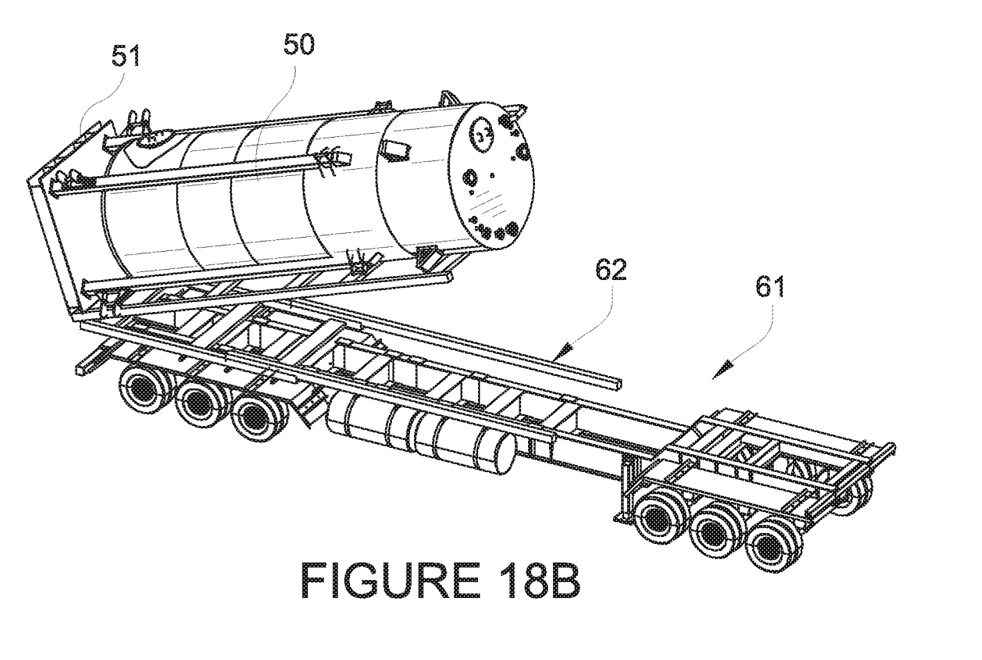
Figure 18C:
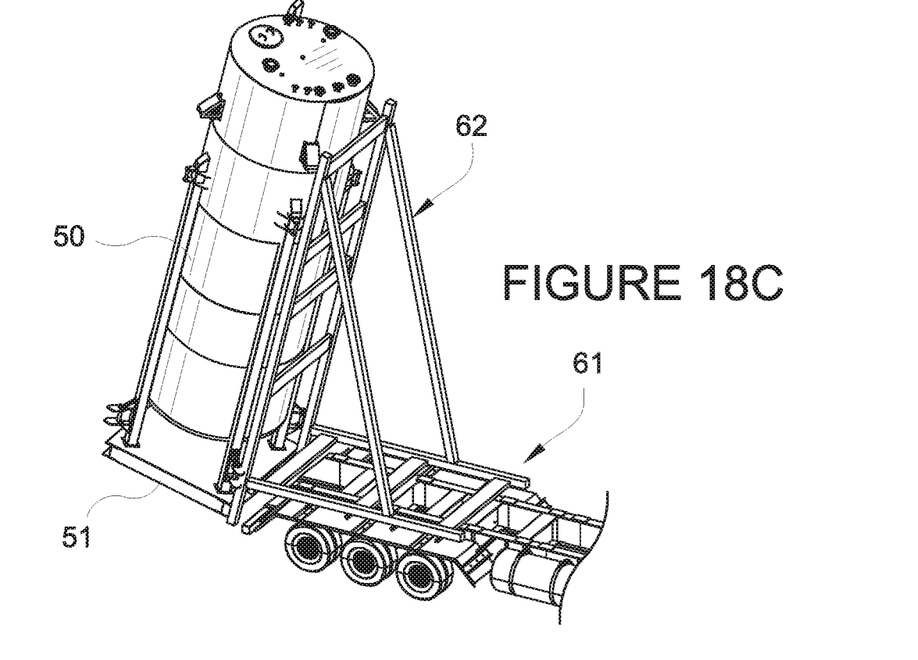
Figure 18D:
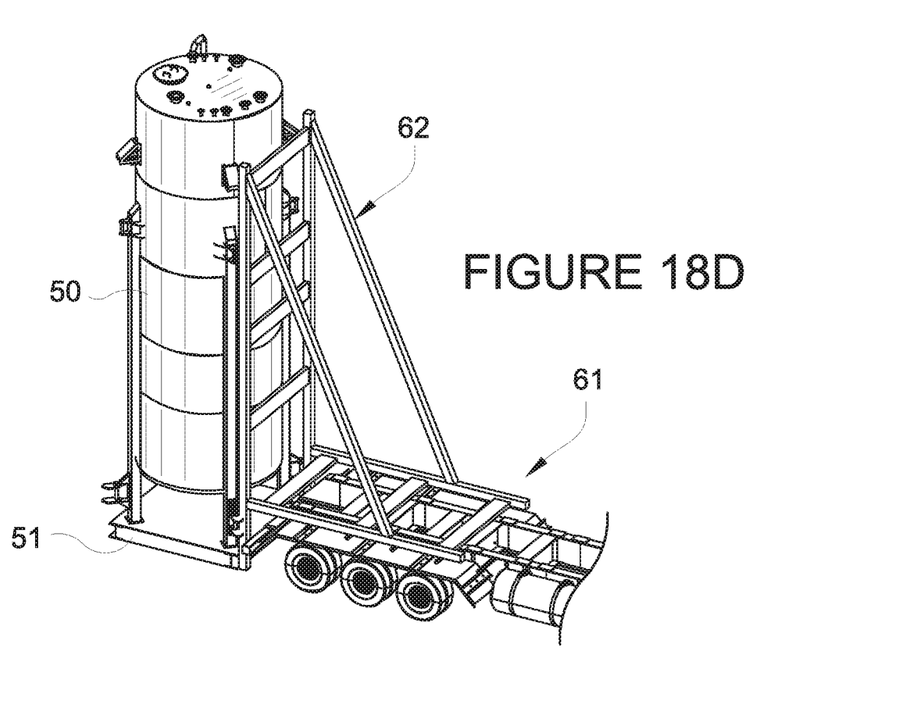

The present invention comprises at least one dual-chambered silo tank 50, each erected upon its own platform 51 and supported vertically by at least three legs 52. As depicted in FIG. 17, silo tank 50 includes upper fuel-dispensing chamber 54 disposed above and coaxial with lower, fuel reservoir chamber 53 within the envelope of silo 50. As depicted, silo tank 50 is approximately ten (10) feet in diameter and stands approximately thirty-five (35) feet tall, and chambers 53, 54 have the same diameter. One having ordinary skill in the art will recognize that silo tank 50 could vary in diameter, height and proportions without departing from the scope of the present invention, its geometry being limited by transportation constraints as discussed below.

Preferably, upper dispensing chamber 54 has a capacity of approximately 5500 gallons of fuel volume, while lower reservoir chamber 53 holds 9000-10,000 gallons of fuel volume, making the total fuel storage capability of silo tank 50 approximately 15,000 gallons, one third of which is elevated approximately twenty-four (24) feet above grade. Because it is disposed at the top one-third of a substantially 35 foot tall column (silo tank 50), fuel within upper fuel dispensing chamber 53 maintains a head pressure comfortably above the minimum seven (7) psi required to gravity feed fuel through hoses 11, 12 to fracking units 3.

Dispensing conduit 57 couples to bottom 55 of upper fuel dispensing chamber 54 and gravity feeds fuel into trunk hoses 11, as discussed above. Refill conduit 58 couples between both chambers 53, 54 and permits a fuel pump (not shown) to keep upper dispensing chamber 54 filled to near capacity, thereby maintaining the outlet pressure through conduit 57 reliably constant. Periodically, when lower chamber 53 nears empty, a fuel delivery truck (not shown) may be coupled to a fill nozzle (not shown) also coupled to the fuel pump to refill lower reservoir chamber 53 without disrupting flow from upper dispensing chamber 54

Portability

Turning now also to FIGS. 18A-18D, silo tank 50 is shown being installed at site 1. Horizontally disposed on trailer 61 (FIG. 18A), silo tank 50 can be transported on roadways and highways between sites 1. Upon arriving at site 1, silo 50 quickly may be elevated into its vertical operating position (FIGS. 18B-18D in sequence) to rest upon its platform 51. Hydraulic lifts (not shown) on board trailer 61 extend to erect gantry 62 bearing silo tank 50. No separate crane or other equipment is needed at site 1 for the purpose, as the same vehicle 61 which hauls silo tank 50 on the roadways also lifts it into its operating position. Once silo tank 50 is settled into place, gantry 62 is hauled away on trailer 61, and returned comparatively quickly to remove and relocate silo tank 50 as needed.

In operation, a crew (not shown) brings silo tank 50 to site 1 and erects it onto platform 51 at a select location within site 1 near but a safe distance away from fracking units 3. The crew deploys hoses 11 from silo tank 50 toward fracking units 3 and positions manifolds 13 conveniently where each may couple one or more branch hoses 12 to a like number of fracking units 3. Valves 30 are secured to caps 25 selected to fit the mouths of tanks 5 and inserted into tanks 5. Hoses 12 are coupled to caps 25 employing interfaces 20, as discussed above, and meters 26 tested for wireless connectivity to van 15. Silo tank 50 then is filled with fuel by pumping it into lower reservoir chamber 53, then upward through fill pipe 58 to upper dispensing chamber 54. When fracking units 3 are ready to operate, an operator (not shown) opens controls 14 on manifolds 13 to enable gravity feed of fuel into tanks 5 as they are drained by equipment on fracking units 3. When operations cease at site 1, the foregoing steps may be reversed to remove the present invention from site 1 for relocation to another site.

While the invention has been particularly shown and described with reference to preferred and alternate embodiments, it will be understood by those skilled in the art that various changes in form and detail may be made therein without departing from the spirit and scope of the invention. For example, the entire system has been described in the context of refueling hydraulic fracking units, but it could just as easily serve other sites having different purposes and equipment.

We claim:

1. A refueling system for continuous refueling of motorized equipment, said motorized equipment including at least one fuel tank having a tank fuel reservoir and at least one fuel tank nozzle, the refueling system comprising
    a chambered fuel silo having
        a vertical silo axis extending between a silo bottom and a silo top;
        a silo perimeter coaxial with said silo axis and disposed a select radial distance from said silo axis;
        a lower fuel chamber within said silo perimeter and coaxial with said silo axis, said lower fuel chamber adapted to contain a first volume of fuel;
        an upper fuel chamber within said silo perimeter and disposed axially above said lower fuel chamber, said upper fuel chamber adapted to contain a second volume of fuel;
    refilling means coupled between said lower fuel chamber and said upper fuel chamber and adapted to refill said upper fuel chamber with fuel from said lower fuel chamber;
    fuel recharging means coupled to said lower fuel chamber for periodically recharging said lower chamber with fuel;
    dispensing means for dispensing fuel from said upper fuel chamber into said trunk hoses;
    a plurality of trunk hoses coupled to said chambered fuel silo and extending toward said motorized equipment; and
    float valve means coupled between said trunk hoses and each one of said at least one fuel tank.

2. The refueling system of claim 1 wherein said refilling means comprises
    a fuel pump coupled to said lower fuel chamber and in fluid communication with said first volume of fuel; and
    a fuel conduit coupled between said fuel pump and in fluid communication with said upper fuel chamber.

3. The refueling system of claim 1 wherein said fuel recharging means comprises
    an external valve coupled to and in fluid communication with said lower fuel chamber, said external valve adapted to admit fuel into said lower fuel chamber from a fuel source;
    a fuel pump coupled to said lower fuel chamber and in fluid communication with said first volume of fuel.

4. The refueling system of claim 1 and further comprising
    a base coupled to said silo bottom below said lower fuel chamber, said base adapted to support said chambered fuel silo in a vertical position, said base having
        at least three legs arrayed coaxially around and extending parallel to said silo axis a spaced distance below said silo bottom; and
        a platform disposed on said at least three legs distal said silo bottom and normal to said silo axis, said platform extending outward from said at least three legs a spaced distance substantially equivalent to said radial perimeter.

5. The refueling system of claim 1 wherein said dispensing means comprises
    a valve coupled to a lower end of said upper fuel chamber and in fluid communication with said second volume of fuel; and
    at least one fuel conduit coupled between said valve and said trunk hoses.

6. The refueling system of claim 5 and further comprising
    at least one manifold coupled to said trunk hoses, said at least one manifold having a plurality of tap lines, each tap line coupled to one of said at least one fuel tank.

7. The refueling system of claim 1 and further comprising
    monitoring means for monitoring and controlling fuel flow into each of said at least one fuel tank.

8. The refueling system of claim 7 wherein said monitoring means comprises
    a plurality of transmitters, one each of said plurality of transmitters coupled to one of said float valve means, said refilling means and said dispensing means, each transmitter adapted to measure and transmit fuel flow rates and fuel pressure levels at each of said float valve means, refilling means and dispensing means;

a central controller adapted to
   receive transmissions from said transmitters;
   accumulate fuel flow rates for each of said at least one fuel tank;
   calculate in real time said first volume of fuel and said second volume of fuel;
   operate said refilling means to maintain a substantially consistent second volume of fuel within said upper fuel chamber;
   operate said dispensing means to maintain substantially constant fuel pressure and flow rate to said float valve means; and
   provide alerts when fuel flow rates and fuel flow volumes transmitted by said transmitters coupled to said float valve means fail to match fuel flow volume and fuel flow rates from said dispensing means.

9. The refueling system of claim 1 and further comprising
at least one trailer adapted to carry said chambered fuel silo on a public roadway with said chambered fuel silo disposed in a horizontal transport position above said public roadway, said trailer having
   a planar deck substantially horizontal and parallel to said public roadway, said planar deck having a tongue adapted to couple to a towing tractor for towing said at least one trailer on said public roadway; and
   a gantry coupled between said chambered fuel silo and said planar deck, said gantry adapted to lift said chambered fuel silo from said horizontal transport position into a vertical operating position.

10. The refueling system of claim 9 wherein
said chambered fuel silo further includes
   a base coupled to said silo bottom below said lower fuel chamber, said base adapted to support said chambered fuel silo in a vertical position, said base having
      at least three legs arrayed coaxially around and extending parallel to said silo axis a spaced distance below said silo bottom; and
      a platform disposed on said at least three legs distal said silo bottom; and
   said gantry is adapted to erect said chambered fuel silo in said vertical operating position supported on said platform.

11. The refueling system of claim 1 wherein said float valve means comprises
   a cap adapted to mate with said fuel tank nozzle, said cap including a cap port removably coupled to one of said trunk hoses;
   a valve head having a longitudinal valve axis and coupled coaxially to said cap, said valve head adapted to insert into said fuel tank through said fuel tank nozzle, said valve head having
      a fuel inlet chamber coupled to said cap port and in fluid communication with said trunk hose, said fuel inlet chamber having an outlet port surrounding and defining an outlet port having a valve seat;
      an outlet chamber coupled to said outlet port and in fluid communication with said tank fuel reservoir;
      a plunger coupled between said fuel inlet chamber and outlet chamber, said plunger having a plunger head adapted to seat within said valve seat and to seal said outlet port, said plunger adapted to articulate between a closed plunger position sealing said outlet port and an open plunger position;
   a float disposed coaxial with said valve head distal said cap, said float having
      a cylindrical float body coaxial with said longitudinal valve axis and a diameter sized to be admitted through said fuel tank nozzle, said float body adapted to articulate axially in response to a level of fuel within said fuel tank reservoir;
      pivot linkage coupled between said float body and said plunger, said pivot linkage adapted to urge said plunger to articulate between said open plunger position and said closed plunger position in response to varying levels of fuel within said fuel reservoir.

12. The refueling system of claim 11 and further comprising
   a coaxial float neck coupled to said float distal said valve head; and
   a plurality of roller bearings disposed within said valve head and adapted to engage said coaxial float neck.

13. A refueling system for motorized equipment, said motorized equipment including at least one fuel tank, each of said at least one fuel tank having a tank fuel reservoir and a fuel tank nozzle, the refueling system comprising
   a chambered fuel silo having
      a vertical silo axis extending between a silo bottom and a silo top;
      a silo perimeter coaxial with said silo axis and disposed a select radial distance from said silo axis;
      a lower fuel chamber within said silo perimeter and coaxial with said silo axis, said lower fuel chamber adapted to contain a first volume of fuel;
      an upper fuel chamber within said silo perimeter and disposed axially above said lower fuel chamber, said upper fuel chamber adapted to contain a second volume of fuel;
      refilling means coupled between said lower fuel chamber and said upper fuel chamber and adapted to refill said upper fuel chamber with fuel from said lower fuel chamber;
      fuel recharging means coupled to said lower fuel chamber for periodically recharging said lower chamber with fuel; and
      dispensing means for dispensing fuel from said upper fuel chamber;
   a plurality of trunk hoses coupled to said dispensing means and extending toward said motorized equipment; and
   a plurality of valve interfaces, one valve interface each coupled between one of said plurality of trunk hoses and said fuel tank reservoir of one of at least one fuel tank, each valve interface having
      a cap adapted to mate with said fuel tank nozzle, said cap including a cap port removably coupled to one of said trunk hoses;
      a valve head having a longitudinal valve axis and coupled coaxially to said cap, said valve head adapted to insert into said fuel tank through said fuel tank nozzle, said valve head having
         a fuel inlet chamber coupled to said cap port and in fluid communication with said trunk hose, said fuel inlet chamber having an outlet port surrounding and defining an outlet port having a valve seat;
         a fuel outlet chamber coupled to said outlet port and in fluid communication with said tank fuel reservoir;
         a plunger coupled between said fuel inlet chamber and said fuel outlet chamber, said plunger having a plunger head adapted to seat within said valve seat and to seal said outlet port, said plunger adapted to articulate between a closed plunger position sealing said outlet port and an open plunger position;
a float disposed coaxial with said valve head distal said cap, said float having
a cylindrical float body coaxial with said longitudinal valve axis and a diameter sized to be admitted through said fuel tank nozzle, said float body adapted to articulate axially in response to a level of fuel within said fuel tank reservoir;
pivot linkage coupled between said float body and said plunger, said pivot linkage adapted to urge said plunger to articulate between said open plunger position and said closed plunger position in response to varying levels of fuel within said fuel reservoir.

14. The refueling system of claim 13 and further comprising
at least one manifold coupled to said trunk hoses, said at least one manifold having a plurality of tap lines, each tap line adapted to couple to one of said valve interfaces.

15. The refueling system of claim 13 and further comprising
at least one trailer adapted to carry said chambered fuel silo on a public roadway with said chambered fuel silo disposed in a horizontal transport position above said public roadway, said trailer having
a planar deck substantially parallel to said public roadway, said planar deck having a tongue adapted to couple to a towing tractor for towing said at least one trailer on said public roadway; and
a gantry coupled between said chambered fuel silo and said planar deck, said gantry adapted to lift said chambered fuel silo from said horizontal transport position into a vertical operating position.

16. The refueling system of claim 13 wherein
said chambered fuel silo further includes
a base coupled to said silo bottom below said lower fuel chamber, said base adapted to support said chambered fuel silo in a vertical position, said base having
at least three legs arrayed coaxially around and extending parallel to said silo axis a spaced distance below said silo bottom; and
a platform disposed on said at least three legs distal said silo bottom; and
said gantry is adapted to erect said chambered fuel silo in said vertical operating position supported on said platform.

17. A method of simultaneously fueling multiple units of motorized equipment, each unit of said motorized equipment having at least one fuel tank, said at least one fuel tank having a fuel tank reservoir and a fuel tank nozzle, the method comprising
providing a chambered fuel silo having
a vertical silo axis extending between a silo bottom and a silo top, said silo axis surrounded with a coaxial silo perimeter disposed a select radial distance from said silo axis;
a lower fuel chamber within said silo perimeter and adapted to contain a first volume of fuel;
an upper fuel chamber within said silo perimeter and disposed axially above said lower fuel chamber, said upper fuel chamber adapted to contain a second volume of fuel;
refilling means coupled between said lower fuel chamber and said upper fuel chamber for refilling said upper fuel chamber with fuel from said lower fuel chamber; and
dispensing means for dispensing fuel from said upper fuel chamber;
providing a plurality of trunk hoses; and
providing a plurality of float valves adapted to be received within said at least one fuel tank nozzle;
erecting said chambered fuel silo proximate said multiple units of motorized equipment with its vertical axis disposed vertically; then
installing one of said plurality of float valves into said fuel tank nozzles on each of said at least one fuel tank on each of said multiple units of motorized equipment; then
coupling said plurality of trunk hoses between said dispensing means and said float valves; then
operating said dispensing means to dispense fuel from said upper fuel chamber into said at least one fuel tank; and
maintaining said second volume of fuel by periodically monitoring its level in said upper fuel chamber and refilling said upper fuel chamber with fuel from said lower fuel chamber.

\* \* \* \* \*